US012671689B2

(12) United States Patent
Povilavičius et al.

(10) Patent No.: US 12,671,689 B2
(45) Date of Patent: Jun. 30, 2026

(54) NETWORK DEVICE IDENTIFICATION

(71) Applicant: Cujo LLC, Walnut, CA (US)

(72) Inventors: Karolis Povilavičius, Kaunas (LT);
Justinas Bisikirskas, Kaunas (LT)

(73) Assignee: Cujo LLC, Covina, CA (US)

( * ) Notice: Subject to any disclaimer, the term of this patent is extended or adjusted under 35 U.S.C. 154(b) by 264 days.

(21) Appl. No.: 17/864,157

(22) Filed: Jul. 13, 2022

(65) Prior Publication Data

US 2023/0019306 A1    Jan. 19, 2023

Related U.S. Application Data

(60) Provisional application No. 63/222,369, filed on Jul. 15, 2021.

(51) Int. Cl.
H04L 9/40 (2022.01)

(52) U.S. Cl.
CPC ...... H04L 63/0876 (2013.01); H04L 63/1408 (2013.01); H04L 63/20 (2013.01)

(58) Field of Classification Search
CPC . H04L 63/0876; H04L 63/1408; H04L 63/20; H04L 41/142; H04L 41/16; H04L 43/062; H04L 61/4541; H04L 61/5014; H04L 61/4511
See application file for complete search history.

(56) References Cited

U.S. PATENT DOCUMENTS

| | | | | | |
|---|---|---|---|---|---|
| 6,901,436 | B1* | 5/2005 | Schneider | ............... | H04L 61/30 |
| | | | | | 709/219 |
| 7,085,817 | B1* | 8/2006 | Tock | ..................... | H04L 67/561 |
| | | | | | 709/217 |
| 11,616,793 | B2* | 3/2023 | Fry | ........................ | H04L 41/046 |
| | | | | | 726/23 |
| 2002/0184491 | A1* | 12/2002 | Morgan | .............. | H04L 63/0823 |
| | | | | | 713/157 |
| 2004/0190534 | A1* | 9/2004 | Adrangi | .............. | H04L 61/5084 |
| | | | | | 370/252 |
| 2006/0168221 | A1* | 7/2006 | Juhls | ...................... | H04L 67/567 |
| | | | | | 709/225 |
| 2006/0225125 | A1* | 10/2006 | Shih | .................... | H04L 41/0813 |
| | | | | | 726/2 |

(Continued)

OTHER PUBLICATIONS

NCSC, "Openly Accessible mDNS Servers", Jun. 10, 2022, https://www.ncsc.gov.ie/emailsfrom/Shadowserver/DoS/mDNS/ (Year: 2022).*

(Continued)

*Primary Examiner* — Ramy M Osman
(74) *Attorney, Agent, or Firm* — Dority & Manning, P.A.

(57) ABSTRACT

An apparatus in a computer network system extracts network traffic metadata related to a client computing device of a local network. The network traffic metadata is required by a device fingerprinting process. In response to detecting a multicast DNS (mDNS) packet query in the network traffic metadata, the apparatus collects an mDNS hostname related to the client computing device from the mDNS packet query. In response to determining, at a first point in time, that a dynamic host configuration protocol (DHCP) hostname related to the client computing device is unavailable in the network traffic metadata, the apparatus assigns the mDNS hostname to the client computing device.

13 Claims, 4 Drawing Sheets

| | | | | |
|---|---|---|---|---|
| 530 28.959560 | 10.2.0.37 | 224.0.0.251 | MDNS | 237 Standard query 0x0000 ANY Osvald iPad._companion-link._tcp.local, |
| 531 28.959563 | fe80::4b4:6a9a:14ce_ ff02::fb | | MDNS | 257 Standard query 0x0000 ANY Osvald iPad._companion-link._tcp.local, |
| 617 29.210415 | 10.2.0.37 | 224.0.0.251 | MDNS | 237 Standard query 0x0000 ANY Osvald iPad._companion-link._tcp.local, |
| 618 29.210416 | fe80::4b4:6a9a:14ce_ ff02::fb | | MDNS | 257 Standard query 0x0000 ANY Osvald iPad._companion-link._tcp.local, |
| 646 29.298034 | 10.2.9.37 | 224.0.9.251 | MDNS | 550 Standard query response 0x0000 PTR, cache flush Osvald-iPad.local |
| 647 29.298989 | fe80::4b4:6a9a:14ce_ ff02::fb | | MDNS | 570 Standard query response 0x0000 PTR, cache flush Osvald-iPad.local |
| 648 29.311456 | 10.2.0.37 | 224.0.0.251 | MDNS | 163 Standard query 0x0000 PTR lb._dns-sd._udp.local, "QM" question PTR |
| 649 29.311467 | fe80::4b4:6a9a:14ce_ ff02::fb | | MDNS | 183 Standard query 0x0000 PTR lb._dns-sd._udp.local, "QM" question PTR |
| 670 29.560049 | 10.2.0.38 | 224.0.0.251 | MDNS | 182 Standard query 0x0000 PTR lb._dns-sd._udp.local, "QM" question PTR |

> Frame 530: 237 bytes on wire (1896 bits), 237 bytes captured (1896 bits) on interface \Device\NPF_{750CCS04-9649-4854-AAA2-26970FC9FF72}, id 0
> Ethernet II, Src: Apple_89:21:ac (28:77:f1:89:21:ac), Dst: IPv4mcast_fb (01:00:5e:00:00:fb)
> Internet Protocol Version 4, Src: 10.2.0.37, Dst: 224.0.0.251
> User Datagram Protocol, Src Port: 5353, Dst Port: 5353
∨ Multicast Domain Name System (query)
  > Transaction ID: 0x0000
  > Flags: 0x0000 Standard query
    Questions: 2
    Answer RRs: 0
    Authority RRs: 4
    Additional RRs: 1
  ∨ Queries
    > Osvald iPad._companion-link._tcp.local. type ANY, class IN, "QM" question
    ∨ Osvald-iPad.local: type ANY, class IN, "QM" question
        Name: Osvald-iPad.local
        [Name Length: 17]
        [Label Count: 2]
        Type: * (A request for all records the server/cache has available) (255)
        .000 0000 0000 0001 = Class: IN (0x0001)
        0... .... .... .... = "QU" question: False
  ∨ Authoritative nameservers
    > Osvald iPad._companion-link._tcp.local: type SRV, class IN, priority 8, weight 0, port 49459, target Osvald-iPad.local
    > Osvald-iPad.local: type AAAA, class IN, addr fe80::4b4:6a9a:14ce:8935
    > Osvald-iPad.local: type AAAA, class IN, addr 2a00:1eb8:c803:2f00:37:d26b:5f16:b77e
    > Osvald-iPad.local: type A, class IN, addr 10.2.0.37
  ∨ Additional records
    > _Axxxx._tcp.local ...

(56) References Cited

U.S. PATENT DOCUMENTS

| 2006/0242260 A1* | 10/2006 | Sakou | H04L 61/5076 |
| | | | 709/217 |
| 2012/0089713 A1* | 4/2012 | Carriere | H04L 61/5014 |
| | | | 709/222 |
| 2014/0269703 A1* | 9/2014 | Sundaresan | H04L 61/4511 |
| | | | 370/390 |
| 2017/0005914 A1* | 1/2017 | Edge | H04L 45/745 |
| 2017/0288965 A1* | 10/2017 | Cebere | H04L 12/4625 |
| 2017/0331789 A1* | 11/2017 | Kumar | H04L 63/0272 |
| 2018/0048540 A1* | 2/2018 | Zhang | H04L 61/5014 |
| 2018/0295134 A1* | 10/2018 | Gupta | H04L 67/56 |
| 2019/0296979 A1* | 9/2019 | Gupta | G06N 20/00 |
| 2019/0306182 A1 | 10/2019 | Fry et al. | |
| 2021/0184964 A1* | 6/2021 | Ranjbar | H04L 45/64 |
| 2021/0203521 A1 | 7/2021 | Konda et al. | |
| 2021/0297423 A1* | 9/2021 | Gagnon | G06F 9/45558 |
| 2022/0158909 A1* | 5/2022 | Chandrasekaran | H04L 61/103 |
| 2023/0019306 A1* | 1/2023 | Povilavicius | H04L 63/20 |

OTHER PUBLICATIONS

Michels, Gregor, "Written Submission in preparation to Oral Proceedings", Feb. 13, 2026, EP Application 22 184 346.9-1207 (Year: 2026).*

Extended European Search Report for EP Patent Application No. 22184346.9, mailed Dec. 2, 2022, 10 pages.

Huitema, C., et al., "Current Hostname Practice Considered Harmful," Internet Engineering Task Force (IETF), Request for Comments No. 8117, Mar. 10, 2017, 12 pages.

Office Action for Canadian Patent Application No. 3,167,446, mailed Sep. 28, 2023, 5 pages.

Office Action for Canadian Patent Application No. 3,167,446, mailed Aug. 9, 2024, 5 pages.

Huitema et al., "Current Hostname Practice Considered Harmful", Request for Comments 8117, Mar. 2017, 12 pages.

Office Action for Canadian Patent Application No. 3,167,446, dated Jul. 31, 2025, 4 pages.

Summons to Attend Oral Proceedings for European Patent Application No. 22184346.9, dated Nov. 25, 2025, 7 pages.

* cited by examiner

<u>200</u> EXTRACT NETWORK TRAFFIC METADATA RELATED TO CLIENT COMPUTING DEVICE OF LOCAL NETWORK REQUIRED BY DEVICE FINGERPRINTING PROCESS

<u>201</u> IN RESPONSE TO DETECTING MDNS PACKET QUERY IN NETWORK TRAFFIC METADATA, COLLECT MDNS HOSTNAME RELATED TO CLIENT COMPUTING DEVICE FROM MDNS PACKET QUERY

<u>202</u> IN RESPONSE TO DETERMINING, AT FIRST POINT IN TIME, THAT DHCP HOSTNAME RELATED TO CLIENT COMPUTING DEVICE IS UNAVAILABLE, ASSIGN MDNS HOSTNAME TO CLIENT COMPUTING DEVICE

<u>203</u> IN RESPONSE TO COLLECTING, AT SECOND POINT IN TIME THAT IS AFTER FIRST POINT IN TIME, DHCP HOSTNAME RELATED TO CLIENT COMPUTING DEVICE, OVERWRITE MDNS HOSTNAME BY ASSIGNING DHCP HOSTNAME TO CLIENT COMPUTING DEVICE

FIG. 2

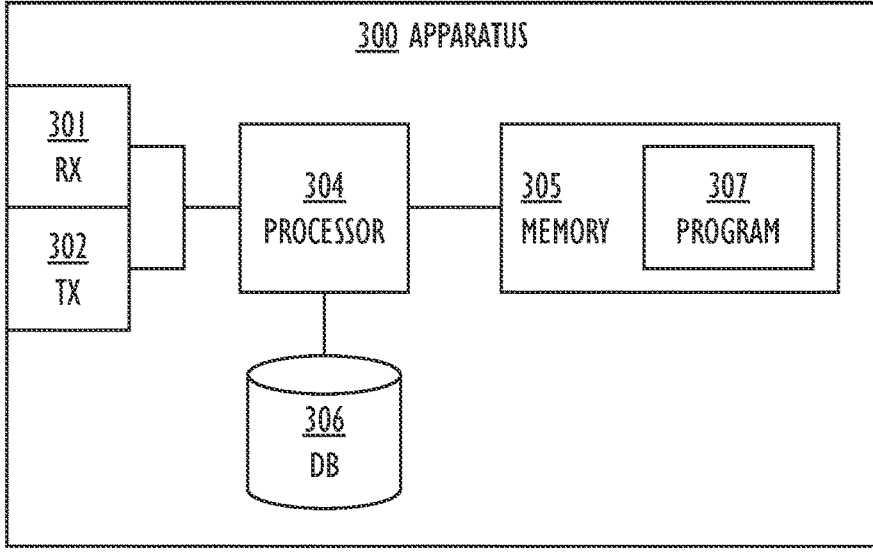

<u>300</u> APPARATUS

<u>301</u> RX

<u>302</u> TX

<u>304</u> PROCESSOR

<u>305</u> MEMORY

<u>307</u> PROGRAM

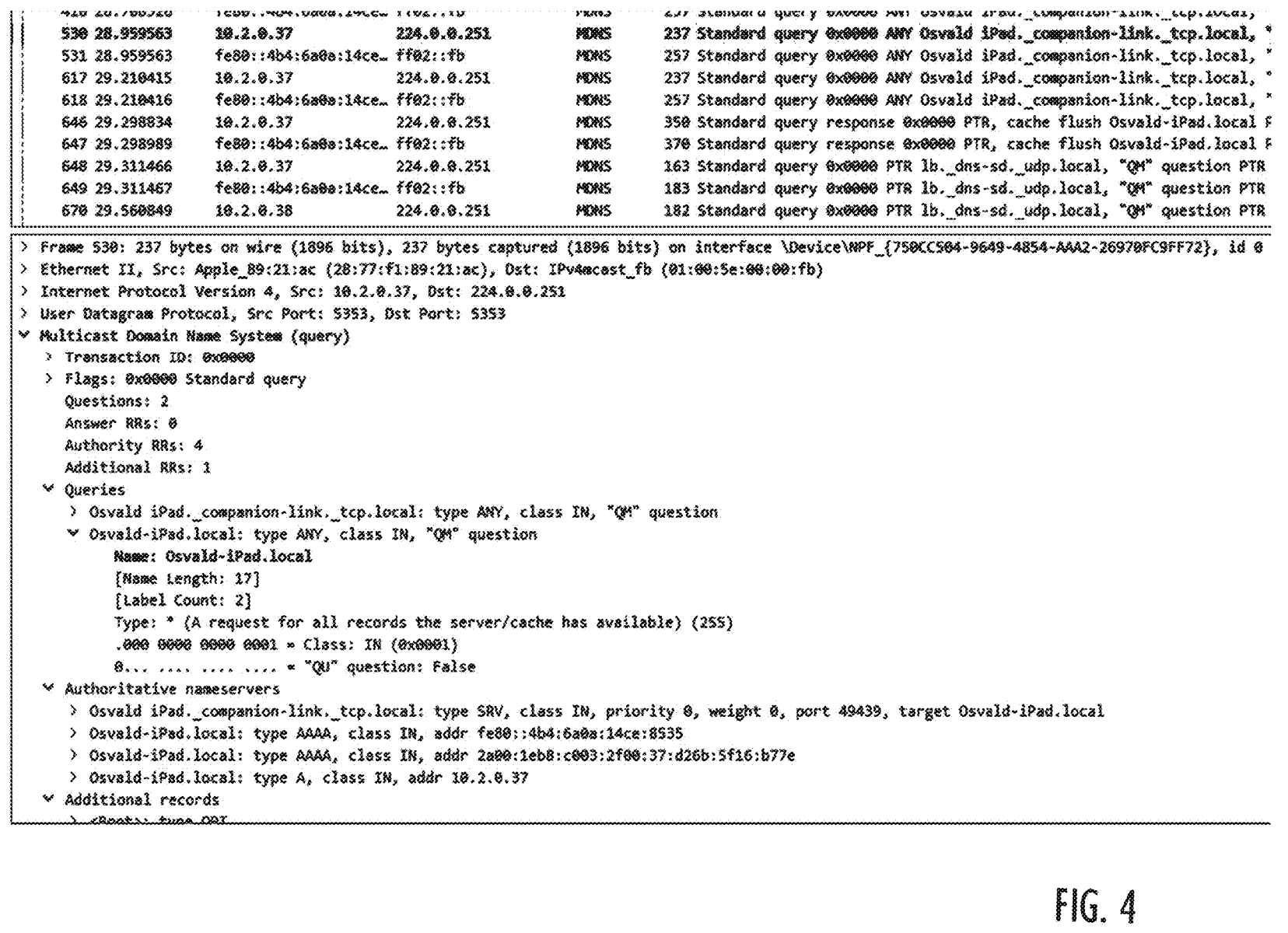

```
...   ...         ...          ...          MDNS   ...  standard query 0x0000 ANY Osvald iPad._companion-link._tcp.local, *
530  28.959563    10.2.0.37    224.0.0.251  MDNS   237  Standard query 0x0000 ANY Osvald iPad._companion-link._tcp.local, *
531  28.959563    fe80::4b4:6a0e:14ce..  ff02::fb  MDNS  237  Standard query 0x0000 ANY Osvald iPad._companion-link._tcp.local, *
617  29.210415    10.2.0.37    224.0.0.251  MDNS   237  Standard query 0x0000 ANY Osvald iPad._companion-link._tcp.local, *
618  29.210416    fe80::4b4:6a0e:14ce..  ff02::fb  MDNS  257  Standard query 0x0000 ANY Osvald iPad._companion-link._tcp.local, *
646  29.298834    10.2.0.37    224.0.0.251  MDNS   350  Standard query response 0x0000 PTR, cache flush Osvald-iPad.local F
647  29.298989    fe80::4b4:6a0e:14ce..  ff02::fb  MDNS  370  Standard query response 0x0000 PTR, cache flush Osvald-iPad.local F
648  29.311466    10.2.0.37    224.0.0.251  MDNS   163  Standard query 0x0000 PTR 1b._dns-sd._udp.local, "QM" question PTR
649  29.311467    fe80::4b4:6a0e:14ce..  ff02::fb  MDNS  183  Standard query 0x0000 PTR 1b._dns-sd._udp.local, "QM" question PTR
670  29.560849    10.2.0.38    224.0.0.251  MDNS   182  Standard query 0x0000 PTR 1b._dns-sd._udp.local, "QM" question PTR > Frame 530: 237 bytes on wire (1896 bits), 237 bytes captured (1896 bits) on interface \Device\NPF_{750CC984-96A9-4854-A4A2-26970FC9FF72}, id 0
> Ethernet II, Src: Apple_89:21:ac (28:77:f1:89:21:ac), Dst: IPv4mcast_fb (01:00:5e:00:00:fb)
> Internet Protocol Version 4, Src: 10.2.0.37, Dst: 224.0.0.251
> User Datagram Protocol, Src Port: 5353, Dst Port: 5353
v Multicast Domain Name System (query)
  > Transaction ID: 0x0000
  > Flags: 0x0000 Standard query
    Questions: 2
    Answer RRs: 0
    Authority RRs: 4
    Additional RRs: 1
  v Queries
    > Osvald iPad._companion-link._tcp.local: type ANY, class IN, "QM" question
    v Osvald-iPad.local: type ANY, class IN, "QM" question
        Name: Osvald-iPad.local
        [Name Length: 17]
        [Label Count: 2]
        Type: * (A request for all records the server/cache has available) (255)
        .000 0000 0000 0001 = Class: IN (0x0001)
        0... .... .... .... = "QM" question: False
  v Authoritative nameservers
    > Osvald iPad._companion-link._tcp.local: type SRV, class IN, priority 0, weight 0, port 49439, target Osvald-iPad.local
    > Osvald-iPad.local: type AAAA, class IN, addr fe80::4b4:6a0e:14ce:8535
    > Osvald-iPad.local: type AAAA, class IN, addr 2a00:1eb8:c003:2f00:37:d26b:5f16:b77e
    > Osvald-iPad.local: type A, class IN, addr 10.2.0.37
  v Additional records
    > (Root): type OPT
```

FIG. 4

NETWORK DEVICE IDENTIFICATION

RELATED APPLICATION

This application claims the benefit of U.S. Provisional Application No. 63/222,369, filed on Jul. 15, 2021, entitled "NETWORK DEVICE IDENTIFICATION," the disclosure of which is hereby incorporated herein by reference in its entirety.

FIELD

The present application relates generally to a network security, and specifically to identifying devices in a computer network.

BACKGROUND

It is vital to identify network devices in a computer network to enable, for example, controlling access to computer networks or services, applying required communication policies, and/or preventing and monitoring unauthorized access. Thus, it is desirable to provide automated techniques for identifying new devices in computer networks.

SUMMARY

According to an aspect, there is provided subject matter of independent claims. Those skilled in the art will appreciate the scope of the disclosure and realize additional aspects thereof after reading the following detailed description of the embodiments in association with the accompanying drawing figures.

BRIEF DESCRIPTION OF DRAWINGS

The accompanying drawing figures incorporated in and forming a part of this specification illustrate several aspects of the disclosure and, together with the description, serve to explain the principles of the disclosure.

FIG. 2 illustrates an example method, according to one embodiment;

FIG. 3 is a block diagram of an apparatus, according to one embodiment;

FIG. 4 is a use case example illustrating an mDNS packet detail; and

DETAILED DESCRIPTION

The figures and the following description relate to the example embodiments by way of illustration only. Alternative embodiments of the structures and methods disclosed herein will be readily recognized as viable alternatives that may be employed without departing from the principles of what is claimed.

Figure 1:
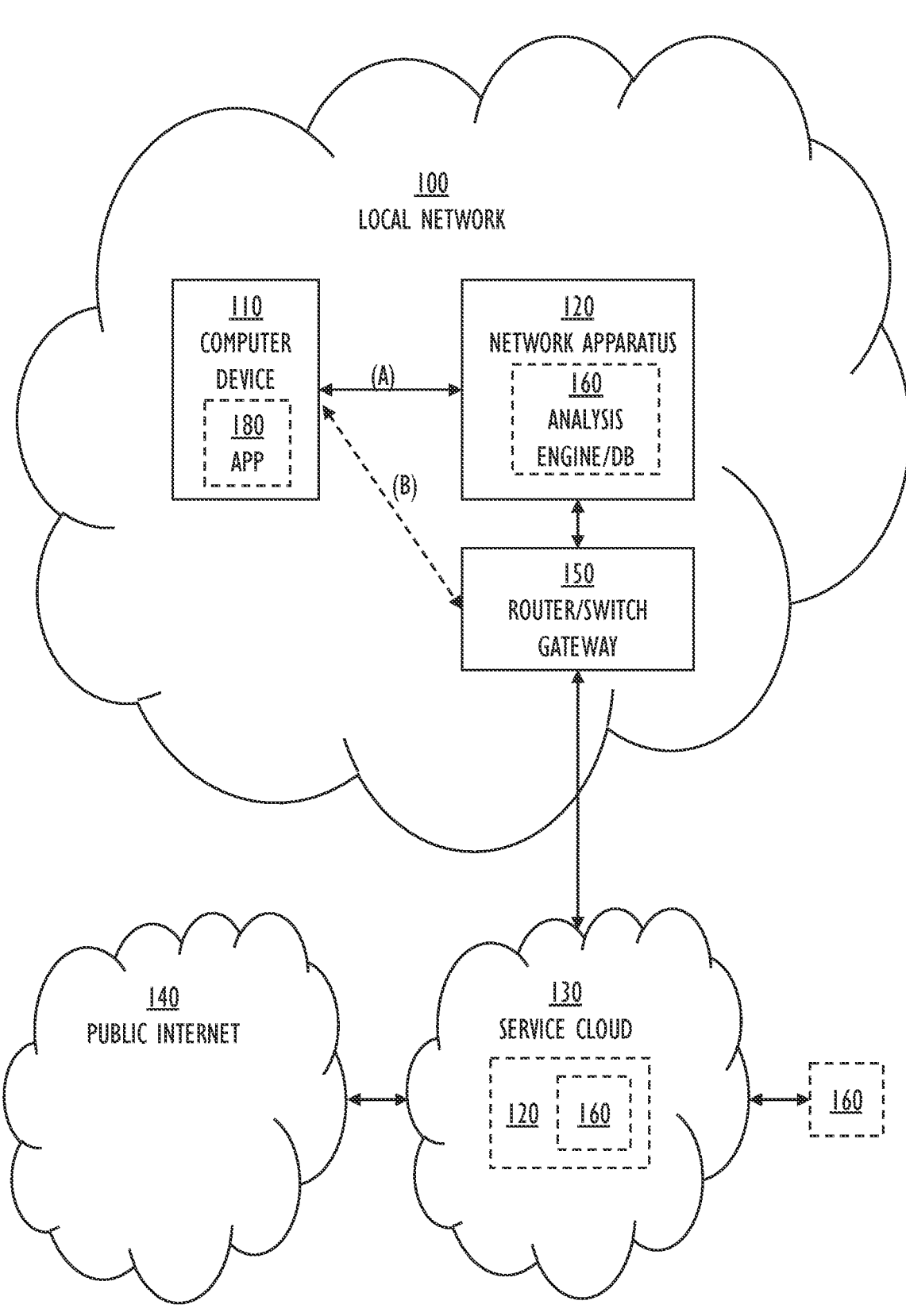
FIG. 1 illustrates an example system environment for a network apparatus in a computer network system.

FIG. 1 illustrates schematically an example of a system environment for a network apparatus 120. The system environment illustrated in FIG. 1 includes a computer network 100, such as a local network, that may include one or more computer devices 110, the network apparatus 120, a local router/switch 150, and an analysis engine and a database 160. The computer devices 110 may also comprise any number of client applications 180, however, this is not required. The example system also includes a service cloud 130, such as a network operator's cloud and the internet 140. The analysis engine/database 160 may reside in the computer network, in the service cloud 130, or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the device 110 may communicate (A) via the network apparatus 120 residing in the computer network 100. In another embodiment, the device 110 may communicate (B) directly via a network gateway or a modem 150, for example when the device is not in the computer network 100.

In an embodiment, the network operators may deploy a service platform on their broadband gateways 150 provided to customers and in their own cloud environments 130. The user device(s) 110 may also be configured to use the services provided by the service cloud 130 by one or more applications/operating systems 180 installed on the device(s) 110.

The device 110 may be any computer device, such a smart device, a smart appliance, a smartphone, a laptop, or a tablet having a network interface and an ability to connect to the network apparatus 120 and/or the local network router 150 with it. The network apparatus 120 collects information about the computer network 100, for example, including data about the network traffic through the computer network 100 and data identifying devices in the computer network 100, such as any smart appliances and user devices 110. The network apparatus 120 is configured to receive traffic control instructions from the analysis engine 160 and to process network traffic based on the traffic control instructions. Processing the network traffic through the computer network 100, for example, can include enforcing network or communication policies on devices, restricting where network traffic can travel, blocking network traffic from entering the computer network 100, redirecting a copy of network traffic packet or features of those packets to the analysis engine 160 for analysis (e.g., for a malicious behavior), or quarantining the network traffic to be reviewed by a user (e.g., via the user device 110) or a network administrator. In some embodiments, the functionality of the network apparatus 120 is performed by a device that is a part of the computer network 100, while in other embodiments, the functionality of the network apparatus 120 is performed by a device outside of the computer network 100.

The network apparatus 120 may be configured to monitor traffic that travels through the computer network 100. In some embodiments, the network apparatus 120 can be a device that is a part of the computer network 100. The network apparatus 120 can be connected to the computer network 100 using a wired connection (e.g., via an Ethernet cable connected to a router) or using a wireless connection (e.g., via a Wi-Fi connection). In some embodiments, the network apparatus 120 can comprise multiple devices. In some embodiments, the network apparatus 120 can also perform the functions of the local network router 150 for the computer network 100.

In some embodiments, the network apparatus 120 may intercept traffic in the computer network 100 by signaling to the user device 110 that the network apparatus 120 is a router 150. In some embodiments, the network apparatus 120 replaces the default gateway or gateway address of the computer network 100 with its own internet protocol address. In some embodiments, the computer network 100 can be structured such that all network traffic passes through the network apparatus 120, allowing the network apparatus 120 to physically intercept the network traffic. For example, the network apparatus 120 can serve as a bridge through which ail network traffic must travel to reach the router 150 of the computer network 100.

The analysis engine 160 may receive and analyze network traffic data (e.g., forwarded by the network apparatus 120) associated with devices on the computer network. The analysis engine 160 may be implemented within a remote system (e.g., a cloud server) or within the computer network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the computer network router 150 may be configured to forward network traffic to the analysis engine 160. In some embodiments, the analysis engine 160 communicates with other devices on the computer network. In some embodiments, the analysis engine 160 is integrated into the network apparatus 120.

The computer network 100 may be a local area network (LAN) that comprises the one or more devices 110, the network apparatus 120, and the local network router 150. The computer network 100 may be used for a number of purposes, including a home network or a network used by a business. The computer network 100 is connected to the internet or other Inter-autonomous network infrastructure 140, allowing devices within the computer network 100, including the user device 110, to communicate with devices outside of the computer network 100. The computer network 100 may be a private network that may require devices to present credentials to join the network, or it may be a public network allowing any device to join. In some embodiments, other devices, like personal computers, smartphones, or tablets, may join computer network 100.

The internet 140 and the computer network 100 may comprise any combination of LANs and wide area networks (WANs), using both wired and wireless communication systems. In some embodiments, the internet 140 and the computer network 100 use standard communications technologies and protocols. Data exchanged over the internet 140 and the computer network 100 may be represented using any suitable format, such as hypertext markup language (HTML) or extensible markup language (XML) or any other presentation or application layer format suitable for transporting data over a network. In some embodiments, all or some of the communication links of the internet 140 and the computer network 100 may be encrypted using any suitable technique or techniques.

The computer device 110 may be a computing device capable of receiving user input as well as transmitting and/or receiving data via the internet 140 or the computer network 100. In some embodiments, the device 110 is a conventional computer system, such as a desktop or a laptop computer. Alternatively, the device 110 may be a device having computer functionality, such as a personal digital assistant (PDA), a mobile telephone, a smartphone, or another suitable device. The device 110 is a network device configured to communicate with the internet 140 or computer network 100. In some embodiments, the device 110 executes an application (e.g., the application 180) allowing a user of the user device 110 to interact with other network devices, such as the smart appliances, the network apparatus 120, the router 150, or the analysis engine 160. For example, the device 110 executes a browser application to enable interaction between the device 110 and the network apparatus 120 via the computer network 100.

The client application 180 is a computer program or software application configured to run on the user device 110. For example, the application 180 is a web browser, a mobile game, an email client, or a mapping program. The device 110 can have any number of applications 180 installed. The application 180 may communicate, via the user device 110, with devices inside and outside of the computer network 100.

The computer network 100 can also be a small office and/or a domestic network that comprises several Internet of Things (IoT) and smart devices as well as portable computers and tablet computers, for example. At least part of these devices are connected to the internet 140, for example, via one or more Wi-Fi (based on IEEE 802.11 standards) access points.

Device identification enriches end-user experience by using hostnames. In computer networking, a hostname is a label assigned to a device connected to a computer network and used to identify the device in various forms of electronic communication. Hostnames may be derived from DHCP (Dynamic Host Configuration Protocol) packets received upon connection. However, hostname does not always have a value in the DHCP packet. Also, according to recent changes in some mobile operating systems, the hostname is not received. For end-users, seeing the hostname gives more personality and diversification since a household can have several same device models which may make identifying devices belonging to different persons more difficult based on just seeing the device model information. With the internet privacy issues getting more and more aggressive worldwide (thereby masking more data), it is important not to lose the end-user experience. Thus, getting data related to the device identification is crucial.

The described embodiments overcome the drawbacks of the previous solutions by applying new capabilities and methods targeted to enable identification of devices based on the network traffic data and also enable an exact device hostname identification. Further, the embodiments not only identify the device hostname but can also identify which hostname should be set for each device. The embodiments propose an automated way to configure hostnames for devices in a computer network. The embodiments enable using multiple protocols to assign a hostname for a device.

The identification of the devices is improved, and, at the same time, user-friendly names are assigned for the end-users to see. For example: specific devices with newest operating system versions do not send DHCP hostnames and thus extracting the hostname from the mDNS (Multicast Domain Name System) protocol can be used.

FIG. 2 is a flow diagram illustrating an embodiment of a method.

In an embodiment, one or more data fragments relating to a device fingerprinting process of each user device are extracted from network traffic data of a plurality of user devices in a computer network.

In 200, network traffic metadata related to a client computing device of a local network is extracted. The network traffic metadata is required by a device fingerprinting process. The network traffic metadata is data that provides information about the network traffic, but not the actual content of the network traffic (in other words, the metadata may be predetermined data fields that identify certain types of network traffic used in the device fingerprinting process). In general, the device fingerprinting process collects information regarding software and hardware of the client computing device so that the client computing device may be identified. Protocols used to transmit data to and from the client computing device may be leveraged to extract stable data, including the hostname. Captured network traffic may be analyzed in the device fingerprinting process to map various captured protocol packets to a single client computing device. For example, the captured mDNS traffic and the captured DHCP traffic may be mapped to a specific client computing device.

In 201, in response to detecting a multicast DNS (mDNS) packet query in the network traffic metadata, an mDNS hostname related to the client computing device is collected from the mDNS packet query.

In 202, in response to determining, at a first point in time, that a dynamic host configuration protocol (DHCP) hostname related to the client computing device is unavailable in the network traffic metadata, the mDNS hostname is assigned to the client computing device.

Note that in some embodiments the underlying hostname may be the same, i.e., even if the hostname is transmitted in the mDNS traffic and later in the DHCP traffic, the hostname is both is the same. In this way, even if the hostname is not transmitted over the DHCP protocol, the hostname is still available from the mDNS protocol.

In an embodiment, the method further comprises: in response to collecting 203, at a second point in time that is after the first point in time, the DHCP hostname related to the client computing device, overwriting the mDNS hostname by assigning the DHCP hostname to the client computing device.

In an embodiment, the method further comprises generating one or more predetermined device identification rules for determining which hostname between the mDNS hostname and the DHCP hostname is selected to be assigned to the client computing device.

In an embodiment, during the device fingerprinting process, the hostname extracted from mDNS packet is collected as a new fingerprint.

In an embodiment, hostnames residing in the mDNS packet queries ending with "local" (i.e., having "local" as the top-level domain (TLD)) are extracted as correct hostnames of the devices. In this way, the correct hostname may be extracted, even if the client computing device transmits more than one different hostname in the mDNS protocol. An example mDNS packet detail is visualized in FIG. 4: "Multicast Domain Name System (query) includes "Name: Osvald-iPadlocal".

In an embodiment, the device identification is enriched by using multiple protocols to assign a user-friendly name for a device.

In an embodiment, if the DHCP hostname is not available, the mDNS hostname is used.

In an embodiment, if both the DHCP hostname and the mDNS hostname are available, the DHCP hostname is selected. In another embodiment, the mDNS hostname is kept even though the DHCP hostname becomes available.

In an embodiment, the selection of the hostname from among multiple available hostnames depends on the logic implemented on the extraction of the mDNS hostname. In an embodiment, depending on the logic and results, the hostname that comes first is selected for setting the device hostname.

In an embodiment, the device identification may further comprise an analysis of historical device model data and an application of one or more of the following: a statistical analysis, encoded decision rules, or one or more artificial intelligence techniques.

In an embodiment, for generating the one or more predetermined device identification rules, one or more of the following are analyzed: a brand of the user device, a type of the user device, a name of the user device, an operating system of the user device, and other extracted data fragments.

Turning now to FIG. 3 that is showing an example of a network apparatus such as a router, a switch, a 5G modem, or another network level apparatus.

A processor device 304 is provided that is configured to identify devices in the monitored computer network. The processor device 304 is configured to extract network traffic metadata related to a client computing device of a local network, wherein the network traffic metadata is required by a device fingerprinting process. The processor device 304 is further configured to collect the mDNS hostname related to the client computing device from the mDNS packet query in response to detecting the multicast DNS (mDNS) packet query in the network traffic metadata. The processor device 304 is further configured to assign the mDNS hostname to the client computing device in response to determining, at a first point in time, that the dynamic host configuration protocol (DHCP) hostname related to the client computing device is unavailable.

In an embodiment, the processor 304 is configured to store data such as any network-based identification data, metadata, attributes, values, MAC addresses, hostnames as well as other data related to connection requests, state information and/or domain data to the database 306. The database 306 is shown in this example as being located at the apparatus 300, but it will be appreciated that the apparatus 300 may alternatively access a remote database. The database 306 may comprise necessary data collected from user devices.

The apparatus 300 is provided with a receiver 301 that receives the connection requests and responses. A transmitter 302 is also provided for communication with the computer device and/or the outside server.

In the above description, the apparatus 300 is described as having a different transmitter and a different receiver. It will be appreciated that these may be disposed in any suitable manner, for example as a separate transmitter and a separated receiver, or as a transceiver (i.e., an integrated single apparatus housing both the transmitter and the receiver). Similarly, a single processor 304 is described but the function of the processor may be performed by a single physical processor or by more than one processor.

The apparatus 300 is also provided with a non-transitory computer readable medium in the form of a memory 305. The memory may be used to store a computer program 307 which, when executed by the processor 300, causes the processor 304 to perform the functions described above. The computer program 307 may be provided from an external source. In an embodiment, at least some or even all the functions of the method can be implemented in any apparatus, for example any user device or a server.

Figure 5:
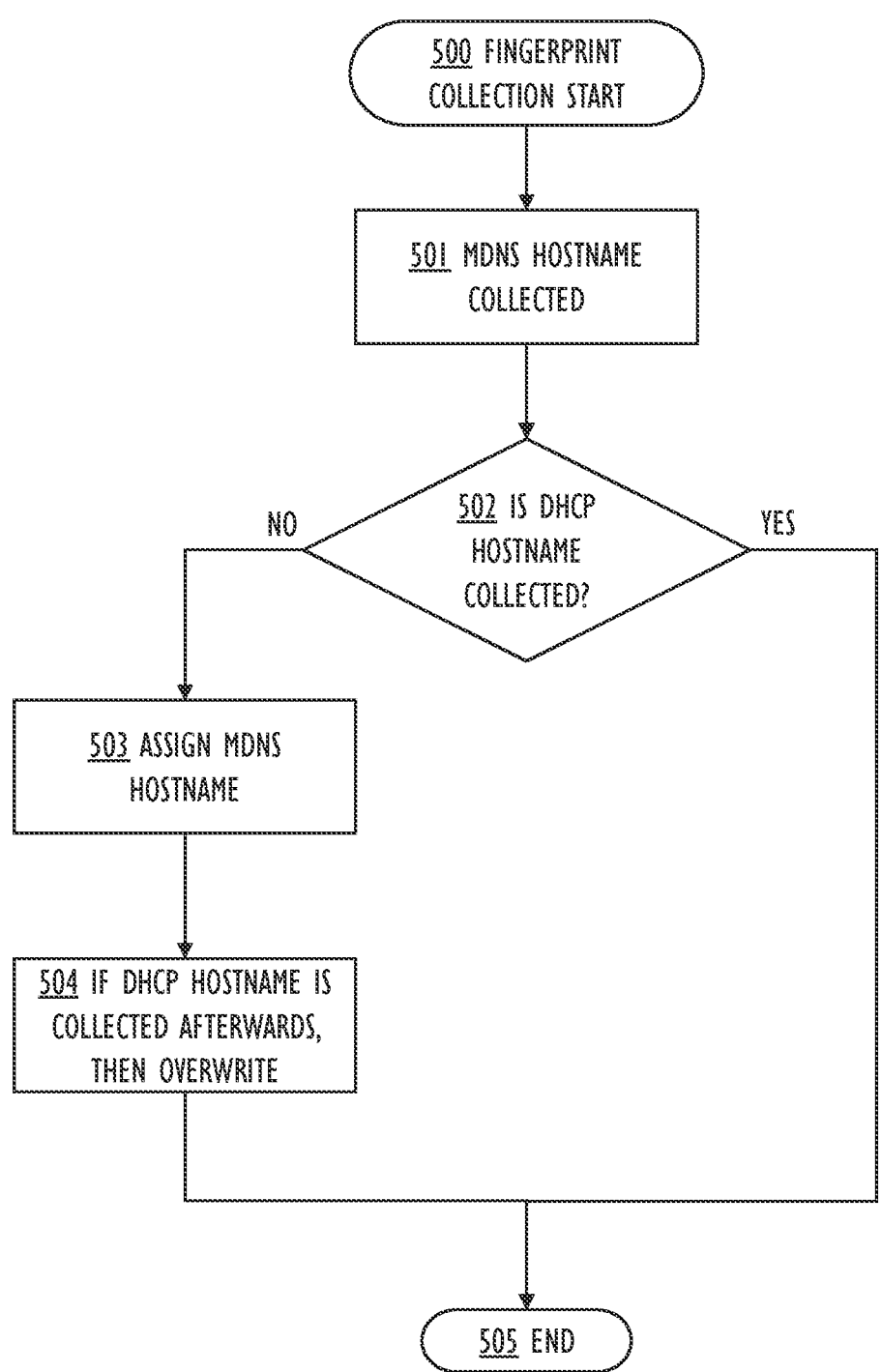
FIG. 5 is a flow diagram illustrating a process according to one embodiment.

FIG. 5 illustrates an example process flow according to an embodiment. In 500, the device fingerprinting related data collection is started. In 501, an mDNS hostname is collected. Next, in 502, it is determined whether a DHCP hostname has been collected. If yes, and the DHCP hostname has already been assigned, the method ends in 505. If the DHCP hostname has not been collected, then the mDNS hostname is assigned to the device in 503. If the DHCP hostname is collected afterwards, then mDNS hostname may be over-written by using the DHCP hostname in 504.

It will be appreciated that various modifications may be made to the above-described embodiments without depart-ing from the scope of the present invention. For example, the database or analysis engine may be in separate entities to the apparatus, in which case the apparatus will send queries remotely to the analysis engine.

The steps, signaling messages and related functions described above in relation to the figures are in no absolute chronological order, and sonic of the steps may be per-formed simultaneously or in a different order. Other func-tions may also be executed between the steps and other signaling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate func-tion. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instruc-tions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-read-able medium comprising stored program code comprised of computer-executable instructions.

Although the invention has been described in terms of preferred embodiments as set forth above, these embodi-ments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate com-bination with any other feature disclosed or illustrated herein.

The invention claimed is:

1. A method comprising:
    extracting, by a computing system, network traffic meta-data related to a client computing device of a local network, wherein the network traffic metadata is required by a device fingerprinting process;
    in response to detecting, by the computing system, a multicast DNS (mDNS) packet query in the network traffic metadata, extracting an mDNS hostname residing in the mDNS packet query, wherein the mDNS hostname is related to the client computing device that transmitted the mDNS packet query;
    in response to determining, by the computing system at a first point in time, that a dynamic host configuration protocol (DHCP) hostname related to the client com-puting device is unavailable in the network traffic metadata, storing, by the computing system, the mDNS hostname as an identifier of the client computing device; and
    in response to extracting, by the computing system at a second point in time that is after the first point in time, the DHCP hostname related to the client computing device from the network traffic metadata, overwriting, by the computing system, the mDNS hostname previ-ously stored by the computing system with the DHCP hostname as the identifier of the client computing device.

2. The method according to claim 1, further comprising:
    generating one or more predetermined device identifica-tion rules for determining which hostname between the mDNS hostname and the DHCP hostname is selected to identify the client computing device.

3. The method according to claim 2, wherein if both the DHCP hostname and the mDNS hostname are available, storing the DHCP hostname as the identifier of the client computing device.

4. The method according to claim 2, wherein the mDNS hostname remains stored as the identifier of the client computing device even if the DHCP hostname becomes available.

5. The method according to claim 2, wherein, for gener-ating the one or more predetermined device identification rules, one or more of the following are analyzed: a brand of the client computing device, a name of the client computing device, an operating system of the client computing device.

6. The method according to claim 1, wherein the mDNS hostname ends with "local".

7. An apparatus in a computer network system compris-ing:
    one or more processor devices, the one or more processor devices configured to:
        extract network traffic metadata related to a client computing device of a local network, wherein the network traffic metadata is required by a device fingerprinting process;
        in response to detecting a multicast DNS (mDNS) packet query in the network traffic metadata, extract an mDNS hostname residing in the mDNS packet query, wherein the mDNS hostname is related to the client computing device that transmitted the mDNS packet query;
    in response to determining, at a first point in time, that a dynamic host configuration protocol (DHCP) hostname related to the client computing device is unavailable in the network traffic metadata, store the mDNS hostname as an identifier of the client computing device; and
    in response to extracting, at a second point in time that is after the first point in time, the DHCP hostname related to the client computing device from the network traffic metadata, overwrite the mDNS hostname previously stored by the computing system with the DHCP host-name as the identifier of the client computing device.

8. The apparatus according to claim 7, the one or more processor devices being further configured to generate one or more predetermined device identification rules for determining which hostname between the mDNS hostname and the DHCP hostname is selected to identify the client computing device.

9. The apparatus according to claim 8, the one or more processor devices being further configured to store the DHCP hostname as the identifier of the client computing device if both the DHCP hostname and the mDNS hostname are available.

10. The apparatus according to claim 8, the one or more processor devices being further configured to allow the mDNS hostname to remain stored as the identifier of the client computing device even if the DHCP hostname becomes available.

11. The apparatus according to claim 8, wherein to generate the one or more predetermined device identification rules, the one or more processor devices being further configured to analyze one or more of the following: a brand of the client computing device, a name of the client computing device, an operating system of the client computing device.

12. The apparatus according to claim 7, wherein the mDNS hostname ends with "local".

13. A non-transitory computer-readable medium comprising stored program code, the program code comprised of computer-executable instructions that, when executed by a processor device, causes the processor device to:

extract network traffic metadata related to a client computing device of a local network, wherein the network traffic metadata is required by a device fingerprinting process;

in response to detecting a multicast DNS (mDNS) packet query in the network traffic metadata, extract an mDNS hostname residing in the mDNS packet query, wherein the mDNS hostname is related to the client computing device that transmitted the mDNS packet query;

in response to determining, at a first point in time, that a dynamic host configuration protocol (DHCP) hostname related to the client computing device is unavailable in the network traffic metadata, store the mDNS hostname as an identifier of the client computing device; and in response to extracting, at a second point in time that is after the first point in time, the DHCP hostname related to the client computing device from the network traffic metadata, overwrite the mDNS hostname previously stored by the computing system with the DHCP hostname as the identifier of the client computing device.

* * * * *